United States Patent [19]

Lepage et al.

[11] Patent Number: 5,685,108
[45] Date of Patent: Nov. 11, 1997

[54] FISHHOOK

[75] Inventors: James B. Lepage, Manchester; Thomas C. Rosenbauer, East Arlington, both of Vt.

[73] Assignee: The Orvis Company, Inc., Manchester, Vt.

[21] Appl. No.: 584,753

[22] Filed: Jan. 11, 1996

[51] Int. Cl.[6] .................................................. A01K 83/00
[52] U.S. Cl. ............................................................. 43/43.16
[58] Field of Search ................................. 43/43.16, 44.82

[56] References Cited

U.S. PATENT DOCUMENTS

| | | | |
|---|---|---|---|
| 2,816,392 | 12/1957 | Goldberg et al. | 43/43.16 |
| 2,841,914 | 7/1958 | Butler | 43/43.16 |
| 4,028,838 | 6/1977 | Flower | 43/43.16 |
| 4,715,142 | 12/1987 | Richard | 43/43.16 |
| 4,757,634 | 7/1988 | Meixsell, Jr. | 43/43.16 |
| 5,097,622 | 3/1992 | James | 43/43.16 |

FOREIGN PATENT DOCUMENTS 102001  12/1925  Austria ............................ 43/43.16

*Primary Examiner*—Kurt Rowan
*Attorney, Agent, or Firm*—Vickers, Daniels & Young

[57] ABSTRACT

A fishhook having improved catch-and-release characteristics is described. The fishhook does not have a conventional barb but rather has two depressions with sharp leading edges in the wire of the hook.

11 Claims, 1 Drawing Sheet

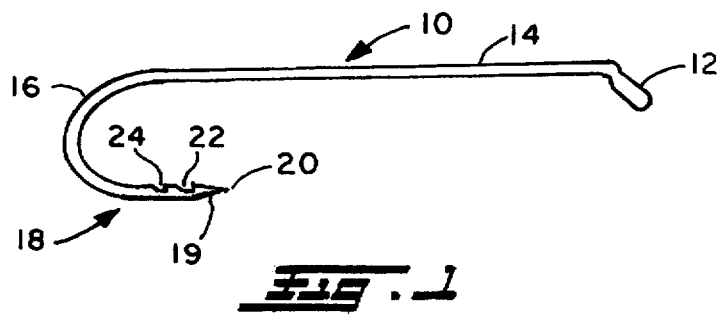
Fig. 1
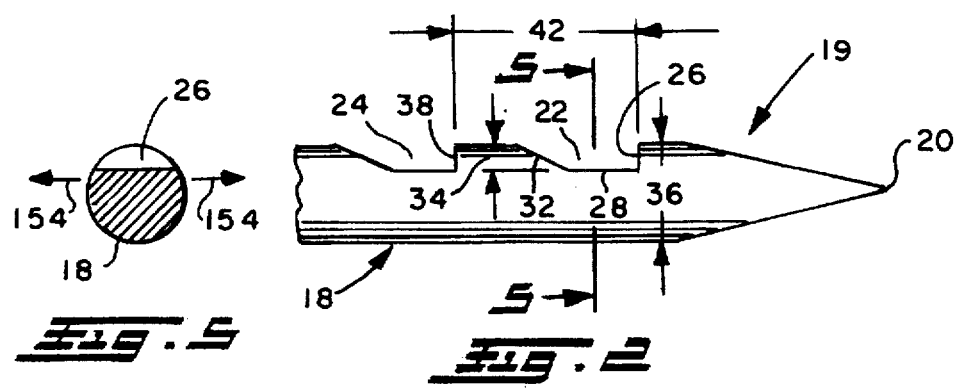
Fig. 5
Fig. 2
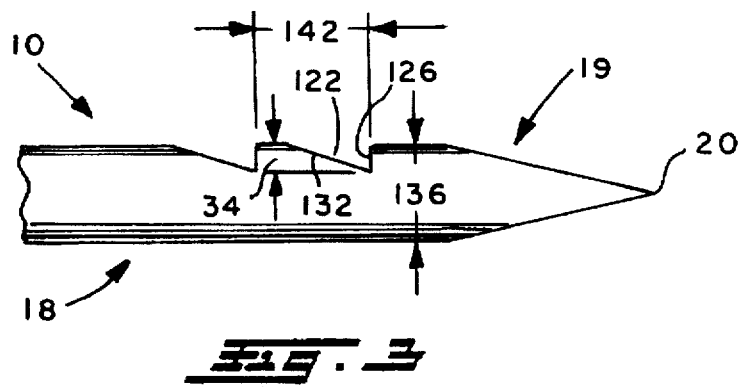
Fig. 3
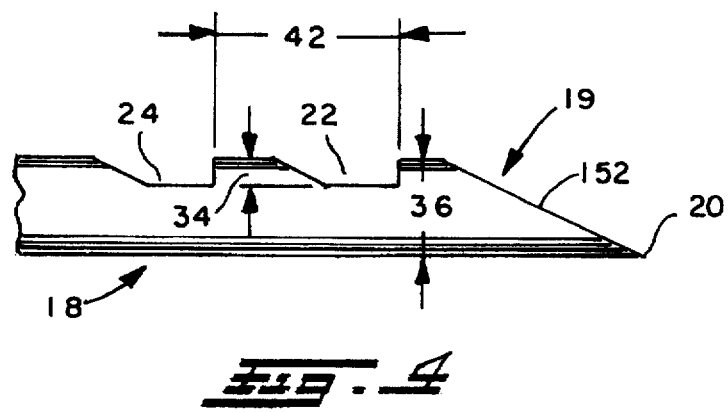
Fig. 4

FISHHOOK

BACKGROUND OF THE INVENTION

This invention relates to fishing and more particularly to an improved fishhook which may be readily removed from fish.

Fishing using a hook attached to the end of a line has been practiced for many, many years. Numerous types and sizes of fishhooks are available to people who fish for sport. Fishhooks vary in size and design as they are used in pursuit in different sizes and types of fish, in different waters, and with different aims. Sport fishing in which a game fish is caught and released has been popular for many years.

In catch-and-release fishing, a fisherman or woman desires to catch a fish with appropriate size tackle, bring the fish into close proximity to the fisherman or woman and release the fish with little or no harm to the fish. This requires a hook which will reliably hold the fish. It also requires a hook which is easily taken into a holding position by a fish. The hook must be easily removed from the fish. Another requirement of such a hook is that it do minimal or no damage to the fish during this process. These requirements are somewhat contradictory. In the past, the primary means of assuring that a hook retained its grip on a fish has been the use of a barb. However, a barb can cause damage to a fish when the hook is removed. Other approaches to satisfy all of the requirements described have also been attempted. None are entirely satisfactory.

Fishhooks are generally comprised of an eye, a shank, a bend, and a spear. The entire structure resembles the letter "J" with the eye at the top of the long leg of the J, the shank forming the long leg of the J, the bend at the bottom of the J, and the spear forming the short leg of the J. The point is located within the spear, and is measured from the sharp tip at the end of a hook back to the tip of the hook barb.

Barbless fishhooks have been made in which the fishhook consists of a piece of wire simply shaped like a J with a sharpened spear. No fish-retaining means at all is provided on the spear. This design is easily removed from the fish. This is desirable when the fish is brought along side the fisherman. However, the design also allows the fish to sometimes escape before the fisherman or woman ever sees the fish.

As described above, a barb is sometimes used to hold the hook in the mouth of a fish. The problem with the barb is that it has a sharp point extending toward the inside of the bend which can injure the fish when one attempts to remove the hook. Others have attempted to address this negative aspect of the barb by use of a mechanical element covering the barb during removal operation. U.S. Pat. No. 2,816,392 to Goldberg describes such a hook. The hook is complicated as it has many parts and is therefore expensive. Moreover, it does not completely address the problem at hand as the hook still has a barb which can cause damage before the covering lever can conceal the barb. Another approach uses a movable barb retained in the hook which rotates into an engaged or disengaged position. This design again uses moving parts and is somewhat more difficult for the fisherman or woman to remove from the fish in that he must reach in the fish and rotate the part before removing the hook. Such a design is described in U.S. Pat. No. 4,757,634 to Meixsell.

Still another approach takes a standard fishhook having a barb on the spear. A fisherman uses a pair of pliers to press the pointed end of the barb back to the spear. One is left with a rounded bump on the spear which provides only minimal holding power in a fish. The operation is not always fully successful. A pointed barb portion may remain. Compressing a barb with a pair of pliers, especially on a very small hook, is difficult.

There is, therefore, a need for a fishhook which has an effective structure for holding a fish, does little or no damage to a fish in the catch-and-release process, and is easily used by fishermen.

SUMMARY OF THE INVENTION

The above described requirements are achieved and the problems described overcome in the present invention in which a fishhook is provided having a shank, a bend portion, and a spear portion in which at least one fish-retaining depression is provided within the cross section of the spear portion.

Preferably, the fish-retaining depression has a wall nearest the point's end which is perpendicular to the axis of the spear.

Still further in accordance with the invention, the wall of the fish-retaining depression away from the point's end is gently sloped from the bottom of the depression to the normal surface of the spear.

Still further in accordance with the invention, the fish-retaining depression is in the side of the spear facing the shank.

Still further in accordance with the invention, the hook is fabricated from a wire having a generally uniform circular cross section and the fish-retaining depression is a planar depression in the surface of the spear portion facing the shank.

Still further in accordance with the invention, two identical fish-retaining depressions are provided in the spear portion of the hook axially spaced from another.

Yet further in accordance with the invention, the depth of the fish-retaining depression is approximately one-third of the diameter of the wire forming the hook.

Still further in accordance with the invention, the wall of the depression nearest to the point's end may vary from approximately perpendicular to the axis of the spear to slightly undercut.

It is the principal object of the present invention to provide a fishhook having good fish-retention characteristics which is easily removed from a fish for catch and release.

It is another object of the present invention to provide a fishhook which can be used in a manner identical to conventional barbed fishhook in fly tying and the like which also provides for ease of release of fish after capture.

It is still another object of the present invention to provide a fishhook having good catch-and-release characteristics having no moving parts.

It is still another object of the present invention to provide a fishhook which has good catch-and-release characteristics which can be used in a manner identical to conventional barbed fishhooks in fly tying and fly fishing.

It is still another object of the present invention to provide an improved catch-and-release fishhook which can be used to tie life-like flies in various sizes and characteristics for use in fly fishing.

It is still another object of the present invention to provide an improved catch-and-release fishhook which is light in weight and can be used in preparing dry flies.

It is still another object of the present invention to provide a fishhook having fish-retaining means within the diameter of the wire formed into the fishhook such that damage to a fish in a catch-and-release program is minimized.

It is still another object of the present invention to provide a fishhook which has good fish-retaining characteristics, good release characteristics, and can be tied into a fly providing good casting characteristics for the fly fisherman or woman.

These and other objects of the present invention will become apparent to those skilled in the art from the following description taken in conjunction with the accompanying drawings wherein:

FIG. 1 shows a side elevation of a complete fishhook in accordance with the invention;

FIG. 2 shows an enlarged elevation of the spear portion of the fishhook of FIG. 1;

FIG. 3 shows an enlarged side elevation of the spear portion of the fishhook of FIG. 1 having a second construction;

FIG. 4 shows an enlarged side elevation of the spear of the fishhook of FIG. 1 in a third embodiment; and FIG. 5 shows a cross section of the spear of FIG. 2 taken along line 5—5.

PREFERRED EMBODIMENT

Referring now to the drawings wherein the showings are for the purposes of illustrating a preferred embodiment of the invention and not for the purpose of limiting same, the figures show a fishhook 10 having an eye 12, a straight shank 14, a return bend portion 16, a spear portion 18, a point portion 19, and a point's end 20. The overall shape of the hook is that of the letter J with the shank 14 forming the longer leg of the J. This J shape is conventional. However, it is not the only shape in which fishhooks come. Fishhooks are available in a wide variety of shapes and the invention to be described is applicable to most if not all of such shapes.

The eye 12 is a circle with a hole through the center to which a fishing line can be tied as is conventional.

As can be seen in FIG. 1, the spear 18 does not have a traditional barb. Most prior art hooks include a barb which extends away from the spear 18 toward the bend portion 16 and the shank 14. The traditional barb has a pointed end meant to retain the hook in the mouth of the fish.

As can be seen in FIG. 1, the fishhook 10 of the present invention has two retaining depressions, 22 and 24. The retaining depressions are shown in greater detail in FIGS. 2-5 which show various implementations of the retaining depressions on an enlarged spear section.

Referring now to FIG. 2, the retaining depression 22 is bounded on the end closest to the point's end by a forward wall 26. "Forward" is used herein to mean closer to the point's end 20 of the point 19. The retaining depression 22 has a flat bottom wall 28 and a sloped rear wall 32. The depth 34 of the depression 22 is about one-third the diameter 36 of the wire formed into the hook. As can be seen in FIG. 2, the forward wall 26 of the depression 22 is substantially perpendicular to the axis of the hook spear 18. A slight undercut would be acceptable as would a slight relief slope. However, a substantial perpendicular forward wall 26 provides holding power while also allowing removal of the hook without damage to the fish. The sloped rear wall 32 allows the lip membrane of the fish to slide into the retaining depression 22 easily and thus provide superior holding when compared to a vertical rear wall or the like. By selecting the depth of the depression 22 to be approximately one-third of the wire diameter 36, one leaves substantial hook material in place. With reference to FIG. 5, it is seen that selecting a one-third diameter depth of depression leaves about 71% of the cross sectional area of the wire in place. This provides adequate strength so the tip 18 does not break in normal use.

The second retaining depression 24 is identical in all respects to the first retaining depression 22. The spacing between the depressions is such that the forward wall 38 of the second retaining depression 24 is spaced from the first forward wall 26 a distance 42 of about 158% of the diameter 36 of the wire. This distance 42 will be referred to as "pitch". On long spear hooks, spacing of about 160% of wire diameter may be appropriate. On shorter spear hooks, such spacing is too great and a pitch of about one wire diameter is more appropriate. Such a construction is shown in FIG. 3.

FIG. 3 shows a variation of the spear 18 in which the pitch 142 is approximately equal to the hook wire diameter 136. The first retaining depression 122 is bounded by a forward wall 126 and a rear wall 132. There is no intervening flat bottom wall corresponding to bottom wall 28 in FIG. 2. The depression 122 has a depth 34 approximately equal to one-third time the wire diameter 136. The rear wall 132 makes an angle of about 30° with the axis of the spear 18 thus providing a gentle entry slope. The forward wall 126 is substantially perpendicular to the axis of the spear 18 providing a fish-retaining surface. As there is no bottom wall to the depression, it is shorter than the depression seen in FIG. 2 allowing a shorter pitch 142 equal to approximately the wire diameter 136.

The point's ends 20 of both FIGS. 2 and 3 are conical spear ends. Some fishing hooks are prepared with a truncated cylindrical point's end rather than a conical point's end. A truncated cylindrical point's end is shown in FIG. 4. A diagonal cut 152 at about 30° to the axis of the spear 18 forms the sharp point's end 20. Here the spear end is on the outside edge of the wire as opposed to on its axis. A depression 22 identical in all respects to the depression 22 described with reference to FIG. 2 is provided on spear 18 shown on FIG. 4. Again, the depth 34 of the depression 22 is about one-third the wire diameter 36. A second depression 24 is also provided identical to the depression 22 and the pitch 42 is about 160% of the wire diameter.

While the depressions 22, 24 are identical in the preferred embodiments, the second depressions can be made less deep thereby increasing hook strength or can be eliminated entirely. The depressions are created in the side of the spear facing the shank to provide maximum retaining power.

The depressions 22, 24 can be created by material removal, forging or hammering the spear 18 with an appropriately shaped tool. Such a process may cause a slight bulging of material outwardly at the bottom of the depression 26. The direction of this bulging is shown by the arrows 154. The diameter of the wire is increased by about 11% by this displacement of material. The bulge is small and smooth and does not interfere with the operation of the hook.

An example of the dimensions used for the preferred embodiment seen in FIG. 3 include a diameter of 1.14 mm, a depth of depression of 0.4 mm and a pitch of 1.2 mm. The example of the preferred embodiments seen in FIG. 2 uses a wire diameter of 1.14 mm, a depth of depression of 0.4 mm with a pitch of 1.8 mm.

The invention has been described with reference to preferred embodiments. Obviously, modifications and alterations will occur to others upon a reading and an understanding of the specification and it is our intention to include such modifications and alterations insofar as they come within the scope of the appended claims.

Having thus described the invention, it is claimed:

1. A fishhook formed from a wire of generally uniform diameter, said fishhook having:

a shank, a curved bend portion, and a barbless spear having an axis generally parallel to said shank having a generally uniform cross section a side facing said shank, a side facing away from said shank, and a point with a point's end, said spear having at least one fish retaining depression in one of said sides near said point's end, said depression having a first wall near said point's end said first wall being generally perpendicular to said axis; and said spear being substantially free of depressions in the side facing away from said shank.

2. The fishhook of claim 1 wherein said depression has a second wall away from said point's end, said second wall being sloped from the bottom of said depression at an angle substantially different from vertical.

3. The fishhook of claim 1 wherein said at least one depression is in the side of said spear facing said shank.

4. The fishhook of claim 1 wherein said depression has a depth, said depression depth being about one-third said diameter.

5. The fishhook of claim 4 wherein said spear has a substantially circular cross section and said depression has a substantially planar bottom wall.

6. The fishhook of claim 1 wherein said spear has two depressions.

7. The fishhook of claim 6 wherein said two depressions each have a first wall perpendicular to said spear axis and a depth of approximately one-third the thickness of said spear.

8. The fishhook of claim 7 wherein the first wall of said depressions are spaced from one another by a distance of from about 1 times said wire diameter to about 1.6 times said wire diameter.

9. The fishhook of claim 1 wherein said at least one depression is a notch having a straight line bottom.

10. The fishhook of claim 1 wherein said at least one depression has a planar bottom and a second wall away from said point's end, said second wall being sloped from the bottom of said depression.

11. A fishhook formed from a wire of generally uniform circular cross section and a generally uniform diameter having:

a shank portion;

a generally U-shaped bend portion;

a spear portion having an axis, a side facing said shank portion, a side facing away from said shank portion, a point and a point's end;

at least one depression in said side facing said shank portion penetrating said wire to about one-third said diameter having a wall near said point's end generally perpendicular to said axis; and, said spear being subtantially free of depressions in the side facing away from said shank.

* * * * *